United States Patent [19]

Hokari

[11] Patent Number: 5,442,622
[45] Date of Patent: Aug. 15, 1995

[54] COMMUNICATION SYSTEM WITH ISDN AS A BACKUP OF INTER-PBX TIE TRUNK

[75] Inventor: Makoto Hokari, Tokyo, Japan

[73] Assignee: NEC Corporation, Tokyo, Japan

[21] Appl. No.: 262,936

[22] Filed: Jun. 21, 1994

[30] Foreign Application Priority Data

Jun. 21, 1993 [JP] Japan .................. 5-172126
Jun. 21, 1993 [JP] Japan .................. 5-172127

[51] Int. Cl.$^6$ .............................................. H04L 1/22
[52] U.S. Cl. ........................................ 370/16; 379/9; 370/58.2; 370/68.1; 370/84; 370/118
[58] Field of Search ............. 379/9, 15, 33, 207, 379/219, 225, 231, 234; 371/8.2, 11.2; 375/122, 25; 370/16, 58.2, 68.1, 84, 85.9, 110.1, 118

[56] References Cited

U.S. PATENT DOCUMENTS 4,586,174  4/1986  Wong .................. 370/118
4,953,195  8/1990  Ikemori .................. 379/9
5,210,740  5/1993  Anzai et al. .................. 370/16

FOREIGN PATENT DOCUMENTS

3-106234  5/1991  Japan .

Primary Examiner—Benedict V. Safourek
Attorney, Agent, or Firm—Sughrue, Mion, Zinn, Macpeak & Seas

[57] ABSTRACT

In a private branch exchange, PBX line interfaces, a tie trunk interface interfacing a distant PBX, an ISDN interface interfacing a public switched ISDN network, and speech codecs are connected to a switch. Each speech codec provides data-rate conversion between a 64-kbps signal and a lower bit-rate signal. A mux-/demux unit is connected between the codecs and the switch for multiplexing the lower bit rate signals from the codecs into a multiplex signal and demultiplexing a multiplex signal into lower bit rate signals for coupling to the codecs, respectively. The switch is controlled in response to a call from a PBX telephone to establish a connection between a line interface and any of the codecs and a connection between the mux/demux unit and the tie trunk interface when the distant PBX is the destination. If the call is destined to an ISDN user, a connection is established between the line interface and the ISDN interface. Should the tie trunk fail, a backup connection is established between the mux/demux unit and the ISDN interface and the ISDN network is signalled to establish a connection between the ISDN interface and the distant PBX.

14 Claims, 6 Drawing Sheets

COMMUNICATION SYSTEM WITH ISDN AS A BACKUP OF INTER-PBX TIE TRUNK

BACKGROUND OF THE INVENTION

1. Field of the Invention

The present invention relates generally to communications between private branch exchanges (PBXs), and more specifically to a technique for establishing an alternate route between the PBXs.

2. Description of the Related Art

It is known to use the public switched ISDN (integrated services digital network) as a backup facility for carrying traffic between two PBXs which are normally interconnected by a dedicated tie trunk. As disclosed in Japanese Provisional Patent Publication 3-106234, the traffic from each of the interconnected PBXs is multiplexed by a time-division multiplexer/demultiplexer and converted to a high bit-rate multiplex signal and transmitted over a tie trunk. At the other end of the trunk, the transmitted signal is demultiplexed for coupling to the other PBX. Each multiplexer/demultiplexer includes an ISDN interface for accommodating an ISDN line connected to the public switched ISDN. The tie trunk is constantly monitored at each end of the trunk. Should the tie trunk fail, a backup route is established between the PBXs through the ISDN interface. A protection switching circuit is provided in each time-division multiplexer for switching the traffic from the tie trunk to the backup route.

However, it is not economical to use the ISDN interface only as a backup facility. Additionally, the provision of the protection switching circuit at each PBX increases the total cost of the interconnected PBXs.

SUMMARY OF THE INVENTION

It is therefore an object of the present invention to provide a PBX that implements an economical inter-PBX communication system.

According to a first aspect, the present invention provides a private branch exchange comprising a switch. A plurality of line interfaces are connected to the switch for accommodating user telephones. A tie trunk interface is connected to the switch for accommodating a tie trunk connected to a distant PBX and an ISDN interface is connected to the switch for accommodating the public switched ISDN network. A plurality of bit-rate compression/expansion means, or speech codecs (coders/decoders) are connected to the switch. Each of the codecs converts a 64-kbps digital signal to a digital signal of a bit rate lower than 64-kbps and converts a lower bit rate digital signal to a 64-kbps digital signal. A mux/demux means is connected between the codecs and the switch for multiplexing the lower bit rate digital signals from the bit-rate compression/expansion means to produce a multiplex signal and demultiplexing a multiplex signal into a plurality of lower bit rate digital signals and applying the lower bit rate digital signals to the codecs, respectively. A controller is associated with all the interfaces for controlling the switch in response to a call from a user telephone to establish a connection between the line interface of the user telephone and any of the speech codecs and a connection between the mux/demux means and the tie trunk interface when the call is destined to the distant PBX. If the call is destined to an ISDN user, the controller establishes a connection between the line interface and the ISDN interface. The controller constantly monitors the tie trunk interface for detecting a failure in the tie trunk. In response to the detection of the failure, a backup connection is established between the mux/demux means and the ISDN interface, instead of the connection between the mux/demux means and the tie trunk interface, and the ISDN network is signalled to establish a connection between the ISDN interface and the distant PBX.

According to a second aspect, the present invention provides a private branch exchange comprising a switch. A plurality of line interfaces are connected to the switch for accommodating user telephones, a tie trunk interface is connected to the switch for accommodating a tie trunk connected to a distant PBX, and an ISDN interface is connected to the switch for accommodating the public switched ISDN network. A plurality of first bit-rate compression/expansion means, or speech codecs and a plurality of second speech codecs are connected to the switch. Each of the first and second speech codecs converts a 64-kbps digital signal to a digital signal of a bit rate lower than 64-kbps and converts a lower bit rate digital signal to a 64-kbps digital signal. A first mux/demux means is connected between the first speech codecs and the switch for multiplexing the lower bit rate digital signals from the first speech codecs to produce a multiplex signal and demultiplexing a multiplex signal into a plurality of lower bit rate digital signals and applying the lower bit rate digital signals to the first speech codecs, respectively. A second mux/demux means is connected between the second speech codes and the switch for multiplexing the lower bit rate digital signals from the second speech codecs to produce a multiplex signal and demultiplexing a multiplex signal into a plurality of lower bit rate digital signals and applying the lower bit rate digital signals to the second speech codecs, respectively. A controller is associated with all the interfaces for controlling the switch in response to a call from a user telephone to establish a connection between the line interface of the user telephone and any of the first speech codecs and a connection between the first mux/demux means and the tie trunk interface when the call is destined to the distant PBX, or a connection between the line interface and the ISDN interface when the call is destined to a user telephone of the ISDN network. The controller constantly monitors the tie trunk interface for detecting when the tie trunk is busy. In response, the controller establishes a connection between the line interface and any of the second speech codecs and a connection between the second mux/demux means and the ISDN interface and sends a call-setup message to the ISDN network to establish a connection between the ISDN interface and the distant PBX.

BRIEF DESCRIPTION OF THE DRAWINGS

The present invention will be described in further detail with reference to the accompanying drawings, in which.

DETAILED DESCRIPTION

Figure 1:
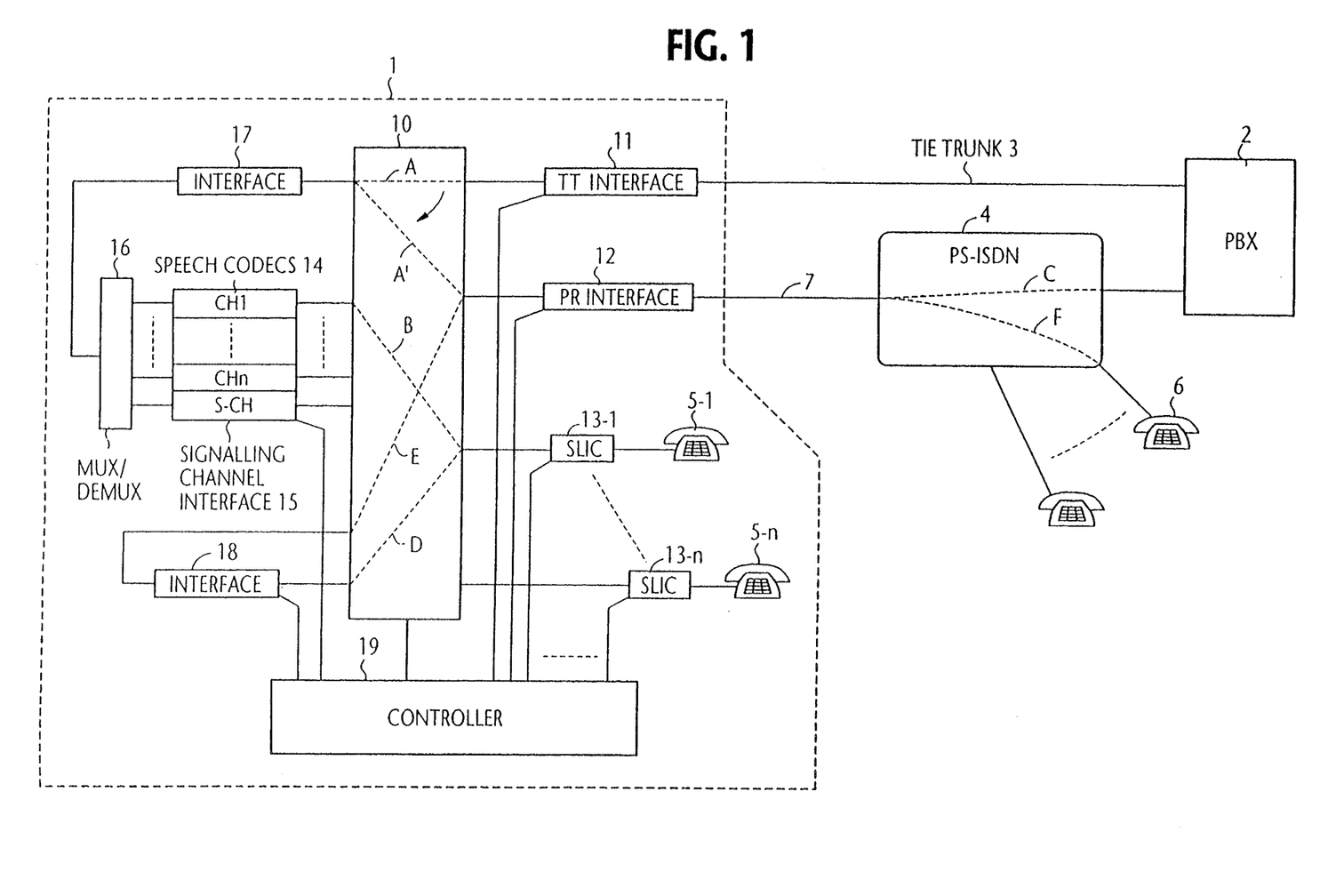
FIG. 1 is a block diagram of a communication system according to a first embodiment of the present invention.

In FIG. 1, a communications system in which the present invention is embodied comprises private branch exchanges (PBXs) 1 and 2 of identical configuration interconnected by a tie trunk 3 which is used with priority and are further interconnected by a public switched ISDN (integrated services digital network) network 4 which is used as a backup route for the PBX-PBX communication as well as for communication between the PBX 1 and a PSTN user telephone 6. As a representative of the PBXs, the details of PBX 1 are shown as comprising a time division switch 10 which is controlled by a controller 19 to establish a connection between a pair of ports of the switch on a time-divided fashion. A tie trunk interface 11 is connected between one port of the time switch 10 and the proximal end of tie trunk 3 whose distal end is connected to the corresponding tie-trunk interface at PBX 2. A primary rate ISDN interface 12 is connected to the time switch 10 for interfacing the network side of time switch 10 to the ISDN network 4 through an ISDN line 7 by establishing a communication path at the (23B+D) ISDN primary rate. A corresponding ISDN interface, not shown, may be provided at PBX 2 for interfacing its time switch to the ISDN 4. Subscriber line interface circuits 13-1~13-n provide interface between PBX extension telephones 5-1~5-n and the time switch 10. Speech codecs (coder/decoder units) 14 and a signalling channel interface 15 are connected to the opposite side of time switch 10 remote from the lines and trunks.

A time-division MUX/DEMUX (multiplexer/demultiplexer) 16 is provided for multiplexing the outputs of speech codecs 14 and signalling channel interface 15 for coupling to one port of the switch 10 via an interface 17 and demultiplexing the distant multiplex signal via the interface 17 into separate signals for coupling to the speech codecs 14 and signaling channel interface 15. Each speech codec 14 provides a conversion of a 64-kbps digital speech signal to a digital speech signal with a bit rate of 16 kbps or less and a conversion of the lower bit rate signal to the original 64-kbps signal. The signalling channel interface 15 has a bit rate of 16 kbps corresponding to the D-channel of the (2B+D) ISDN basic rate. If the bit rate of the low-rate signal is 16 kbps, three low-rate channels and one signaling channel are multiplexed into a single 64-kbps channel. The signalling channel interface 15 transmits a control signal that is used for controlling the speech codecs 14 to the corresponding signaling channel interface at the PBX 2 and receives from it a control signal for controlling the speech codecs 14.

Time switch 10 is further terminated with a plurality of interfaces for interconnecting those ports of the switch on the side opposite to the ISDN network, For purposes of simplicity, only one interface 18 is illustrated.

Controller 19 is further connected to interfaces 11, 12, 13, 15 and 18 to provide channel status supervision and control. Call processing signals between the PBXs 1 and 2 are sent over the D-channel of the primary rate interface 12 and the output of MUX/DEMUX 16 is carried on one of the twenty-three B-channels of the interface.

Figure 2:
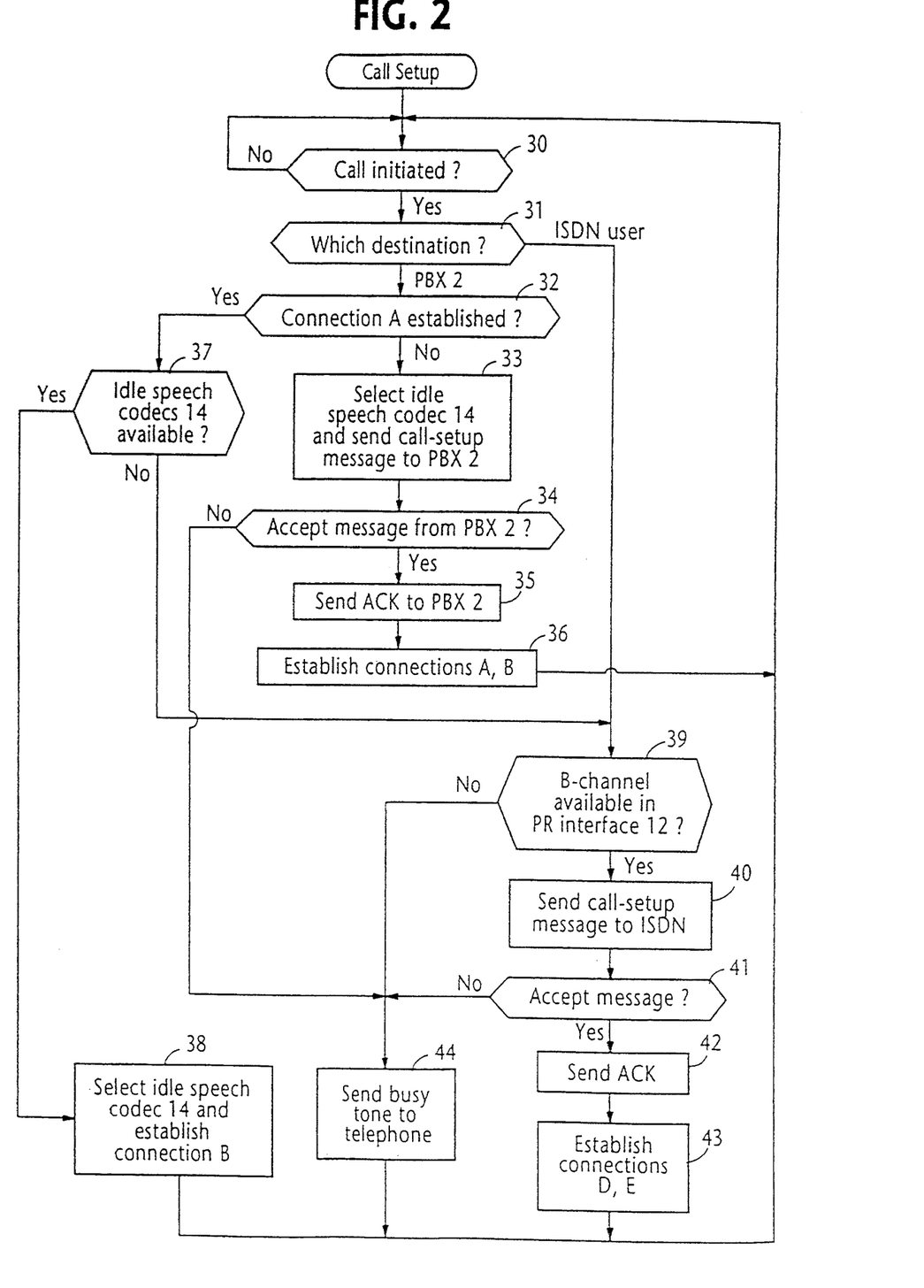
FIG. 2 is a flowchart describing a sequence of operations performed by a PBX controller of FIG. 1 when a call is initiated.

Controller 19 is designed to set up a connection to the distant PBX 2 by executing a call setup procedure shown in FIG. 2. In response to a call setup request from the extension telephone 5-1 (step 30), the controller 19 decodes dialled information supplied from the SLIC 13-1 and determines whether the call is destined to the distant PBX 2 or not (step 31). If the destination is to PBX 2, control branches to step 32 to check to see if a connection A is already established in the time switch 10 between the interfaces 11 and 17. If the connection A is not already established, control branches at step 32 to step 33 to select an idle speech 14 and send a call-setup message from tie-trunk interface 11 to PBX 2. If no accept message is returned in response to the call-setup message, control branches out to step 44 to send a busy tone to the calling PBX telephone. If an accept message is returned from PBX 2 (step 34), the controller 19 sends an acknowledgment (ACK) message to PBX 2 via tie-trunk interface 11 and establishes a connection B between the selected speech codec 14 (channel 1) and the SLIC 13-1 (steps 35, 36) as well as the connection A, and control returns to the starting point of the call setup routine.

If the connection A is already established, control branches at step 32 to step 37 to determine whether idle speech codecs 14 are available. If the answer is affirmative, control branches at step 37 to step 38 to select an idle speech codec 14 and establishes the connection B.

If no idle speech codecs 14 are available, control branches at step 37 to step 39 to check to see if a B-channel is available in the primary-rate interface 12. If so, control proceeds to step 40 to send a call-setup message containing the address of PBX 2 on the D-channel of the primary-rate interface 12 to ISDN 4. If accept message is not returned from PBX 2 (step 41), a busy tone is sent to the calling party. If an accept message is returned from PBX 2 (step 41), controller sends an ACK message to the ISDN to establish a B-channel (64-kbps) connection C to PBX 2 and establishes a connection D in the time switch 10 between SLIC 13-1 and interface 18 and a connection E between interface 18 and primary rate interface 12 (steps 42, 43), so that a communication path is established between telephone 5-1 and a user at PBX 2 through the ISDN. Following the establishment of the communication path, control returns to step 30 to repeat the process.

If the decision at step 31 determines that the call is destined to an ISDN user telephone 6, control branches out to step 39. If a B-channel is available in the primary-rate interface 12, control sends a call-setup message to the ISDN containing the address of the telephone 6 at step 40 on the D-channel of the primary-rate interface 12. If an accept message is returned from the ISDN (step 41), control returns an ACK message (step 42) and establishes connections D and E in time switch 10 and a B-channel connection F through ISDN network to the telephone 6.

Figure 3:
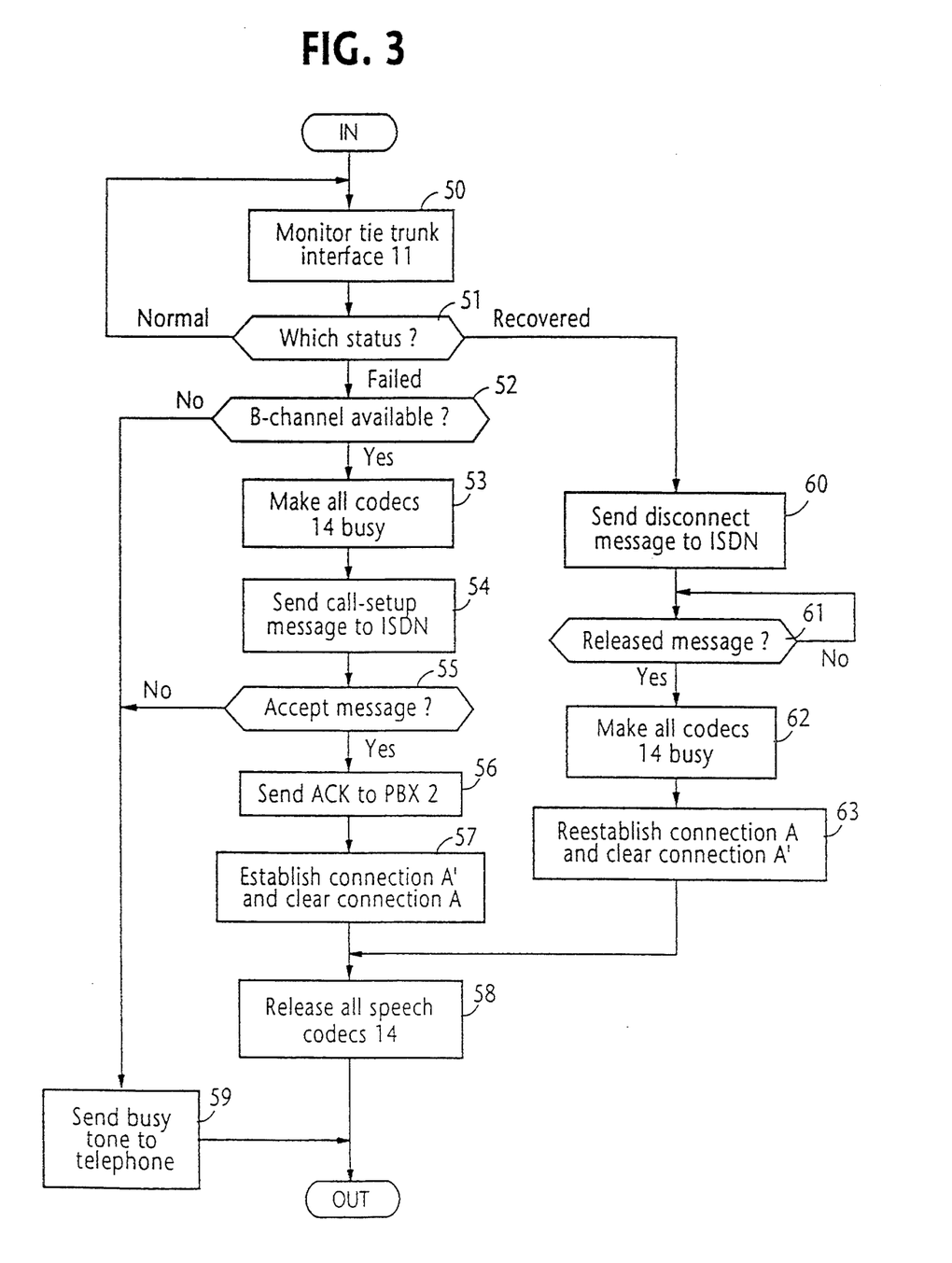
FIG. 3 is a flowchart describing a sequence of operations performed by the controller as an interrupt routine when a PBX-to-PBX tie trunk has failed.

Following the establishment of a connection to the distant PBX 2, control performs an interrupt routine shown in FIG. 3 at periodic intervals. The interrupt routine starts with step 50 to monitor the tie-trunk interface 11 to check for the operating status of the tie trunk 3. If the tie trunk 3 is operating normal, control returns to step 50 to continue monitoring the tie trunk 3. If the controller determines that the tie trunk 3 has failed, control checks for the presence of available B-channels in the primary-rate interface 12. If there is one, control branches to step 53 to make all speech codecs 14 busy by controlling the signalling channel interface 15 to prevent them from being inadvertently sized by another call attempt, and a channel-setup message is sent on the D-channel of the primary-rate interface 12 to the ISDN network (step 54). If the channel-setup message is not accepted by PBX 2 (step 55), a busy tone is sent to the telephone 5-1 (step 59). If the call-setup message is accepted, control branches to step 55 to send an ACK message to PBX 2 (step 56) to establish a B-channel connection C through the ISDN to PBX 2 and directs the time switch 10 to establish a connection A' between interfaces 12 and 17 and clears the connection A (step 57).

At step 58, the signalling channel interface 15 is checked to ascertain that all of the low-rate channels of speech codecs 14 are validly established between the PBXs 1 and 2 via the ISDN 4. If this is the case, all the speech codecs 14 are released to reestablish communications between PBXs 1 and 2 through the ISDN.

When the failed tie trunk has been recovered, control branches at step 51 to step 60 to send a disconnect message on the D-channel of the primary-rate interface 12 to PBX 2. When the latter returns a released message (step 61), all the speech codecs 14 are made busy (step 62) again to prevent them from being inadvertently seized by a call request. At step 63, the connection A is reestablished in the time switch 10 while clearing the connection A'. Control advances to step 58 to control the signalling channel interface 15 to release all the speech codecs 14 to restart communications between the PBXs over the tie trunk.

Figure 4:
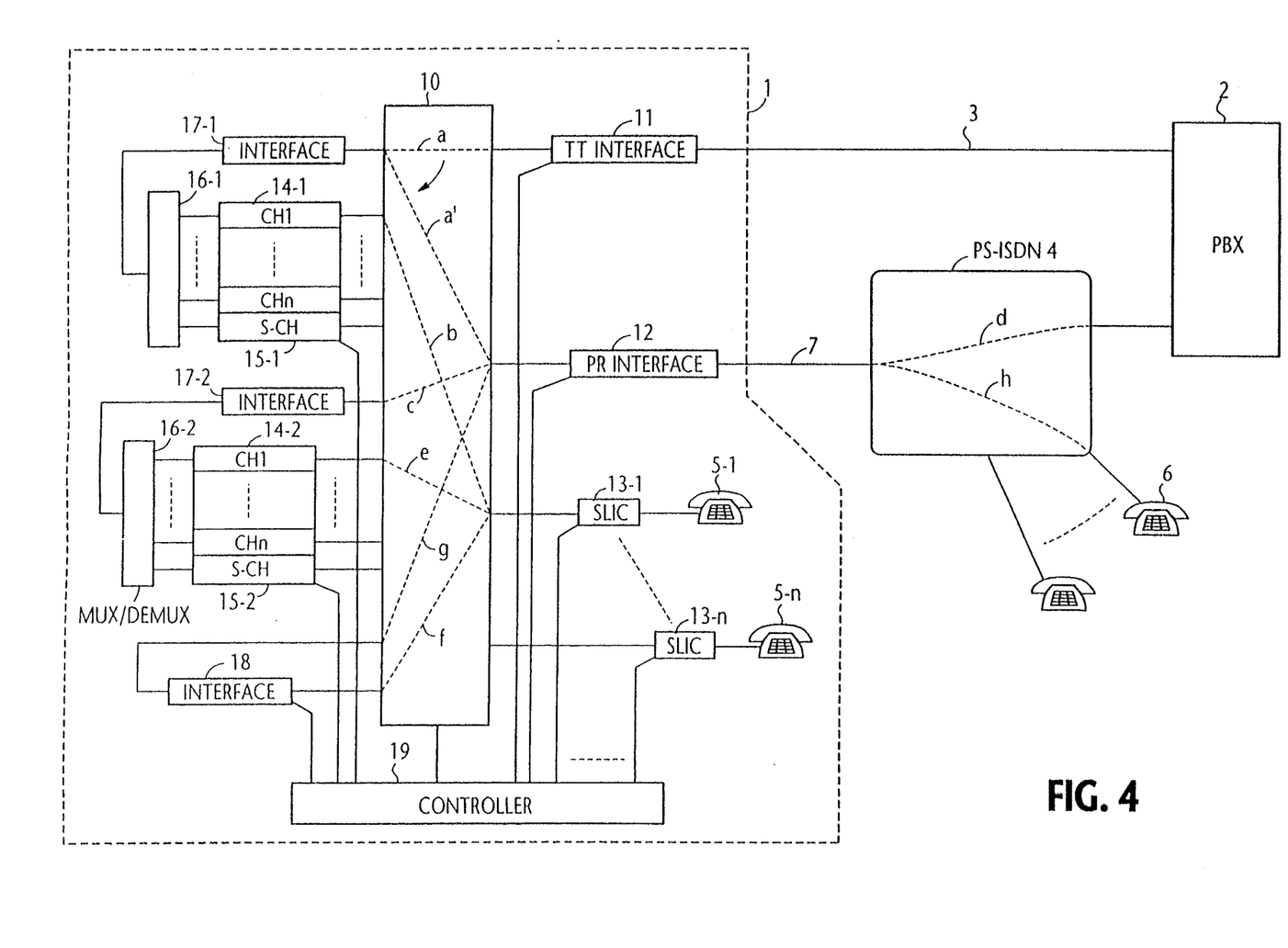
FIG. 4 is a block diagram of a communication system according to a second embodiment of the present invention.

FIG. 4 is a block diagram of a second embodiment of the present invention, which differs from the previous embodiment by the inclusion of a second multiplexer/demultiplexer group of speech codecs 14-2, a signalling channel interface 15-2, a MUX/DEMUX 16-2 and an interface 17-2, in addition to the first MUX/DEMUX group of the corresponding circuits. The circuits of the second MUX/DEMUX group are connected to the same side of time switch 11 to which the circuits of the first MUX/DEMUX group are connected. The speech codecs 14-1 of the first MUX/DEMUX group are used to establish connections to PBX 2 and those of the second group are used to establish connections to PBX 2 via the ISDN when all the channels of the tie trunk are busy or when the tie trunk fails.

Figure 5:
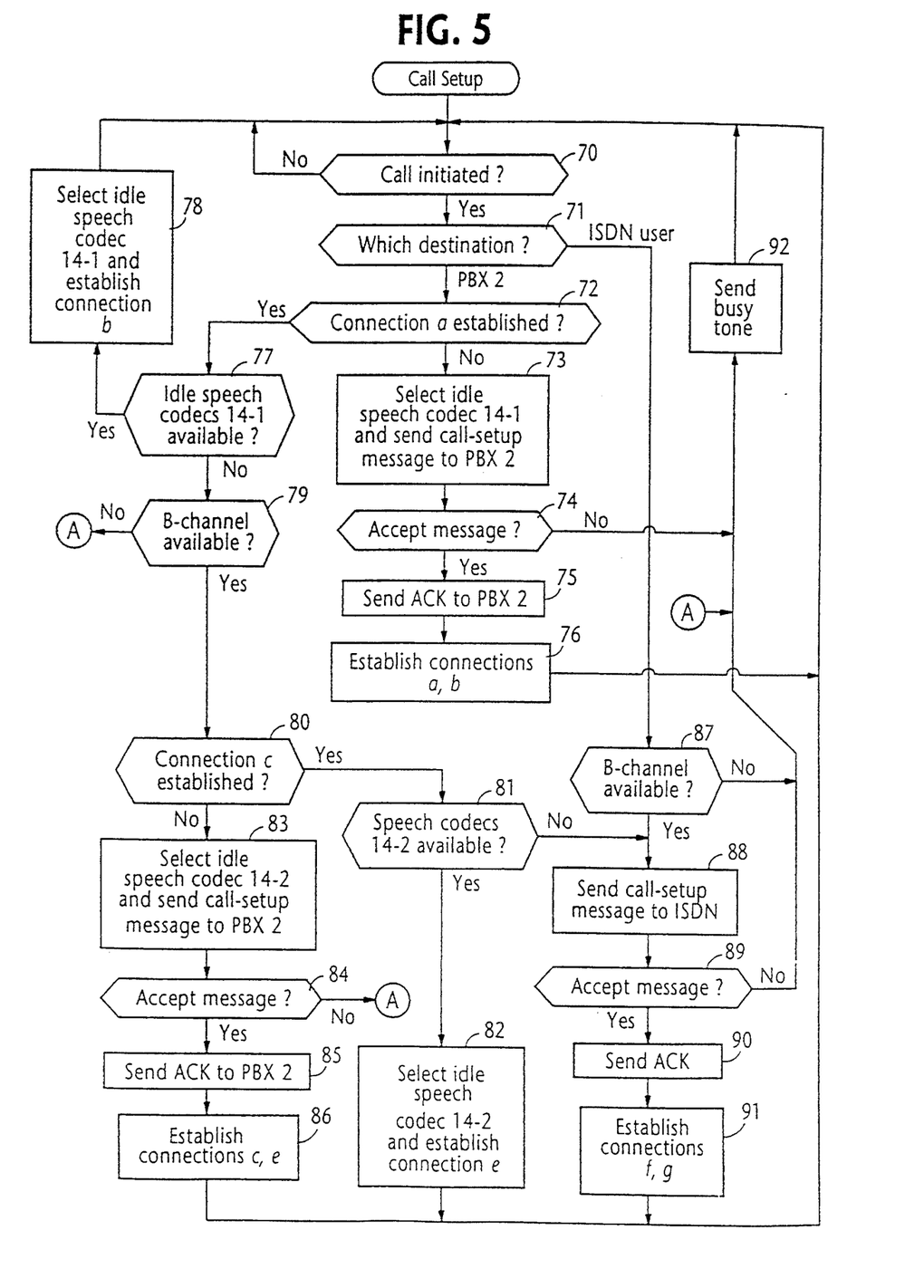
FIG. 5 is a flowchart describing a sequence of operations performed by a PBX controller of FIG. 4 when a call is initiated.
Figure 6:
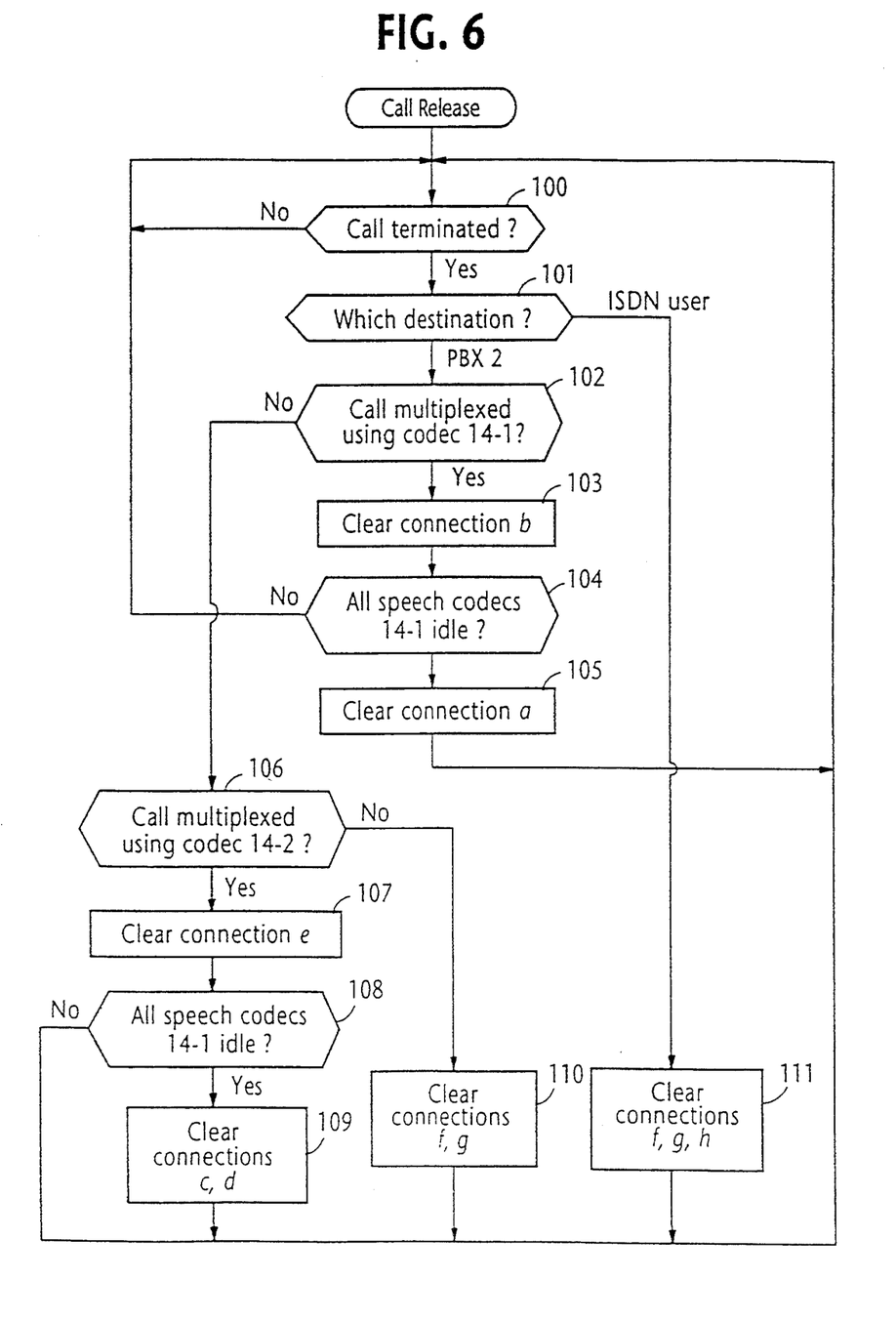
FIG. 6 is a flowchart describing a sequence of operations performed by the PBX controller of FIG. 4 when a call is released.

The call-setup and call-release routines of the controller 19 of FIG. 4 are illustrated in the flowcharts of FIGS. 5 and 6, respectively.

In FIG. 5, when a call is initiated from telephone 5-1, the destination is determined (step 71), and if the call is destined to PBX 2, control branches to step 72 to check to see if a connection a is already established in the time switch 10 between the interfaces 11 and 17-1. If the connection a is not already established, control branches at step 72 to step 73 to select an idle speech 14-1 and send a call-setup message from tie-trunk interface 11 to PBX 2. If no accept message is returned in response to the call-setup message, control branches out to step 92 to send a busy tone to the calling PBX telephone. If an accept message is received (step 74), the controller 19 sends an ACK message to PBX 2 via tie-trunk interface 11 establishes a connection b between the selected speech codec 14 (channel 1) and the SLIC 13-1 (steps 75, 76) as well as the connection a, and control returns to the starting point of the call setup routine. If the connection a is already established, control branches at step 72 to step 77 to determine whether idle speech codecs 14-1 are available. If the answer is affirmative, control branches at step 77 to step 78 to select an idle speech codec 14-1 and establishes the connection b.

If no idle speech codecs 14-1 are available, control branches at step 77 to step 79 to check to see if a B-channel is available in the primary-rate interface 12. If so, control proceeds to decision step 80 to determine whether a connection c is already established between interface 17-2 and primary-rate interface 12. If the connection c has been already established and speech codecs 14-2 are available (steps 80, 81), control proceeds to step 83 to select an idle speech codec 14-2 (say, channel-1) and sends a call-setup message on the D-channel of the primary rate interface 12 to PBX 2 via the ISDN. On receiving an accept message from PBX 2 (step 84), control sends an ACK message to PBX 2 to establish a connection d in the ISDN (step 85) arid establishes a connection e in the time switch 10 between the channel-1 speech codec 14-2 and SLIC 13-1 as well as the connection c (step 86).

If the speech codecs 14-2 are not available, control branches at step 81 to step 88 to send a call-setup message containing the address of the PBX 2 to the ISDN on the D-channel of the primary-rate interface 12. In response to receipt of an accept message (step 89), an ACK message is sent to PBX 2 (step 90) to establish a B-channel connection d through the ISDN network to PBX 2 and establishes a connection f between SLIC 13-1 and interface 18 and a connection g between interface 18 and primary-rate interface 12 (step 91).

If the call is destined to the ISDN telephone 6, control branches at step 71 to step 87 and executes steps 88 to 91 to establish a connection h through the ISDN to telephone 6 and the connections f and g.

If a negative decision is made at steps 79, 84, 87 and 89, control exits to step 92 to send a busy tone to the calling party.

The interrupt routine of FIG. 3 is also performed at periodic intervals in the system of FIG. 4 to monitor the operating status of tie trunk 3. If a failure occurs in the tie trunk 3, B-channel availability check is made on the primary-rate interface 12 and all codecs 14-1 are made busy and a call-setup message is sent to the ISDN to establish a connection a' between interfaces 17-1 and 12 and clears the connection a.

If an existing call is terminated in the system of FIG. 4, the call release procedure of FIG. 6 is followed, starting with step 100. If the destination of the call is PBX 2, control branches at step 101 to step 102 to determine whether the call is converted to a low-bit signal and multiplexed with other signals using a codec 14-1. If this is the case, control advances to step 103 to clear the connection b. Exit then is to decision step 104 to check to see if all the speech codecs 14-1 are idle. If not, control returns to step 100. If all the speech codecs 14-1 are idle, control proceeds to step 105 to clear the connection a. If the call is not multiplexed using a codec 14-1, control branches at step 102 to step 106 to determine whether the call is multiplexed using a codec 14-2. If so, the connection e is cleared (step 107). Exit then is to step 108 to determine whether all speech codecs 14-2 are idle. If the answer is affirmative, the connection c at PBX 1 and the connection d at ISDN 4 are cleared. If all codecs are not idle, control exits step 108 and returns to step 100. If the call is not multiplexed at all, control branches at step 106 to step 110 to clear the connections f and g. If the call is determined to be destined to an ISDN user, control branches at step 101 to step 111 to clear the connections f and g at PBX 1 and the connection h at ISDN 4.

What is claimed is:

1. A private branch exchange comprising:

a switch;

a plurality of line interfaces connected to the switch for accommodating private branch exchange (PBX) user telephones;

a tie trunk interface connected to the switch for accommodating a tie trunk connected to a distant PBX;

an ISDN (integrated services digital network) interface connected to the switch for accommodating a public switched ISDN network;

a plurality of bit-rate compression/expansion means connected to the switch, each of the bit-rate compression/expansion means for converting a 64-kbps digital input signal to a lower bit rate digital output signal and converting a lower bit rate digital input signal to a 64-kbps digital output signal;

mux/demux means connected between said plurality of bit-rate compression/expansion means and the switch for multiplexing the lower bit rate digital output signals from the bit-rate compression/expansion means to produce an output multiplex signal and demultiplexing an input multiplex signal into a plurality of lower bit rate digital signals and applying the demultiplexed lower bit rate digital signals to said bit-rate compression/expansion means, respectively; and control means associated with said line interfaces, said tie trunk interface and said ISDN interface for controlling said switch in response to a call from a said PBX user telephone to establish a connection between the line interface of the said PBX user telephone and any of the bit-rate compression/expansion means and a connection between the mux/demux means and the tie trunk interface when said call is destined to the distant PBX, or a connection between the line interface of the said PBX user telephone and the ISDN interface when said call is destined to a user telephone of the ISDN network, the control means monitoring the tie trunk interface for detecting a failure in the tie trunk and, in response, establishing a backup connection between the mux/demux means and the ISDN interface, instead of the connection between the mux/demux means and the tie trunk interface, and causing the ISDN network to establish a connection between the ISDN interface and the distant PBX.

2. A private branch exchange as claimed in claim 1, further comprising:

a plurality of second bit-rate compression/expansion means connected to said switch, each of the second bit-rate compression/expansion means for converting a 64-kbps digital input signal to a lower bit rate digital output signal and converting a lower bit rate digital input signal to a 64-kbps digital output signal; and second mux/demux means connected between said plurality of second bit-rate compression/expansion means and the switch for multiplexing the lower bit rate digital output signals from the second bit-rate compression/expansion means to produce an output multiplex signal and demultiplexing an input multiplex signal into a plurality of lower bit rate digital signals and applying the demultiplexed lower bit rate digital signals to the second bit-rate compression/expansion means, respectively, wherein the control means comprises means for detecting when the tie trunk is busy and, in response, establishing a connection between the line interface of the said PBX user telephone and any of the second bit-rate compression/expansion means and a connection between the second mux/demux means and the ISDN interface.

3. A private branch exchange as claimed in claim 1, wherein each of said bit-rate compression/expansion means comprises a speech encoder/decoder.

4. A private branch exchange as claimed in claim 1, wherein said control means includes means for making all of said bit-rate compression/expansion means busy before establishing said backup connection arid releasing all of said bit-rate compression/expansion means when said backup connection is established.

5. A private branch exchange as claimed in claim 1, wherein said switch means is a time division switch.

6. A private branch exchange comprising:

a switch;

a plurality of line interfaces connected to the switch for accommodating private branch exchange (PBX) user telephones;

a tie trunk interface connected to the switch for accommodating a tie trunk connected to a distant PDX;

an ISDN (integrated services digital network) interface connected to the switch for accommodating a public switched ISDN network;

a plurality of first bit-rate compression/expansion means connected to the switch, each of the bit-rate compression/expansion means for converting a 64-kbps digital input signal to a lower bit rate digital output signal and converting a lower bit rate digital input signal to a 64-kbps digital output signal;

first mux/demux means connected between said plurality of first bit-rate compression/expansion means and the switch for multiplexing the lower bit rate digital output signals from said first bit-rate compression/expansion means to produce an output multiplex signal and demultiplexing an input multiplex signal into a plurality of lower bit rate digital signals and applying the demultiplexed lower bit rate digital signals to said first bit-rate compression/expansion means, respectively; and a plurality of second bit-rate compression/expansion means connected to the switch, each of the second bit-rate compression/expansion means for converting a 64-kbps digital input signal to a lower bit rate digital output signal and converting a lower bit rate digital input signal to a 64-kbps digital output signal;

second mux/demux means connected between said plurality of second bit-rate compression/expansion means and the switch for multiplexing the lower bit rate digital output signals from said second bit-rate compression/expansion means to produce an output multiplex signal and demultiplexing an input multiplex signal into a plurality of lower bit rate digital signals and applying the demultiplexed lower bit rate digital signals to said second bit-rate compression/expansion means, respectively; and control means associated with said line interfaces, said tie trunk interface and said ISDN interface for controlling said switch in response to a call from a said PBX user telephone to establish a connection between the line interface of the said PBX user telephone and any of said first bit-rate compression/expansion means and a connection between the first mux/demux means and the tie trunk interface when said call is destined to the distant PBX, or a connection between the line interface of the said PBX user telephone and said ISDN interface when said call is destined to a user telephone of said ISDN network, said control means monitoring said tie trunk interface for detecting when said tie trunk is busy and, in response, establishing a connection between the line interface of the said PBX user telephone and any of the second bit-rate compression/expansion means and a connection between said second mux/demux means and the ISDN interface and causing the ISDN network to establish a connection between said ISDN interface and the distant PBX.

7. A private branch exchange as claimed in claim 6, wherein each of said first and second bit-rate compression/expansion means comprises a speech encoder/decoder.

8. A private branch exchange as claimed in claim 1, wherein said switch means is a time division switch.

9. A communication system comprising:

first and second private branch exchanges (PBXs); and a tie trunk for interconnecting said first and second PBXs, each of said PBXs comprising:

a switch;

a plurality of line interfaces connected to the switch for accommodating PBX user telephones;

a tie trunk interface connected to the switch for accommodating the tie trunk;

an ISDN interface connected to the switch for accommodating a public switched ISDN (integrated services digital network) network;

a plurality of bit-rate compression/expansion means connected to the switch, each of the bit-rate compression/expansion means for converting a 64-kbps digital input signal to a lower bit rate digital output signal and converting a lower bit rate digital input signal to a 64-kbps digital output signal;

mux/demux means connected between said plurality of bit-rate compression/expansion means and the switch for multiplexing the lower bit rate digital output signals from the bit-rate compression/expansion means to produce an output multiplex signal and demultiplexing an input multiplex signal into a plurality of lower bit rate digital signals and applying the demultiplexed lower bit rate digital signals to said bit-rate compression/expansion means, respectively; and control means associated with said line interfaces, said tie trunk interface and said ISDN interface for controlling said switch in response to a call from a said PBX user telephone to establish a connection between the line interface of the said PBX user telephone and any of the bit-rate compression/expansion means and a connection between the mux/demux means and the tie trunk interface when said call is destined to the other PBX, or a connection between the line interface of the said PBX user telephone and the ISDN interface when said call is destined to a user telephone of the ISDN, the control means monitoring the tie trunk interface for detecting a failure in the tie trunk and, in response, establishing a backup connection between the mux/demux means and the ISDN interface, instead of the connection between the mux/demux means and the tie trunk interface, and causing the ISDN network to establish a connection between the ISDN interface and the other PBX.

10. A communication system as claimed in claim 9, wherein each of said bit-rate compression/expansion means comprises a speech encoder/decoder.

11. A communication system as claimed in claim 8, wherein said switch means is a time division switch.

12. A communication system comprising:

first and second private branch exchanges (PBXs); and a tie trunk for interconnecting said first and second PBXs, each of said PBXs comprising:

a switch;

a plurality of line interfaces connected to the switch for accommodating PBX user telephones;

a tie trunk interface connected to the switch for accommodating said tie trunk;

an ISDN (integrated services digital network) interface connected to the switch for accommodating a public switched ISDN network;

a plurality of first bit-rate compression/expansion means connected to the switch, each of the bit-rate compression-expansion means for converting a 64-kbps digital input signal to a lower bit digital output signal and converting a lower bit rate digital signal to a 64-kbps digital output signal;

first mux/demux means connected between said plurality of bit-rate compression/expansion means and the switch for multiplexing the lower bit rate digital signals from said bit-rate compression/expansion means to produce a multiplex output signal and demultiplexing an input multiplex signal into a plurality of lower bit rate digital signals and applying the demultiplexed lower bit rate digital signals to said bit-rate compression/expansion means, respectively; and a plurality of second bit-rate compression/expansion means connected to the switch, each of the second bit-rate compression/expansion means for converting a 64-kbps digital signal to a digital signal of a lower bit rate digital signal and converting a lower bit rate digital signal to a 64-kbps digital output signal;

second mux/demux means connected between said plurality of second bit-rate compression/expansion means and the switch for multiplexing the lower bit rate digital output signals from said second bit-rate compression/expansion means to produce an output multiplex signal and demultiplexing an input multiplex signal into a plurality of lower bit rate digital signals and applying the demultiplexed lower bit rate digital signals to said second bit-rate compression/expansion means, respectively; and control means associated with said line interfaces, said tie trunk interface and said ISDN interface for controlling said switch in response to a call from a said PBX user telephone to establish a connection between the line interface of the said PBX user telephone and any of said first bit-rate compression/expansion means and a connection between the first mux/demux mean and the tie trunk interface when said call is destined to the other PBX, or a connection between the line interface of said PBX user telephone and said ISDN interface when said call is destined to a user telephone of said ISDN network, said control means monitoring said tie trunk interface for detecting when said tie trunk is busy and, in response, establishing a connection between the line interface of said PBX user telephone and any of the second bit-rate compression/expansion means and a connection between said second mux/demux means and the ISDN interface and causing the ISDN network to establish a connection between said ISDN interface and the other PBX.

13. A communication system as claimed in claim 12, wherein each of first and second said bit-rate compression/expansion means comprises a speech encoder/decoder.

14. A communication system as claimed in claim 12, wherein said switch means is a time division switch.

* * * * *

UNITED STATES PATENT AND TRADEMARK OFFICE
CERTIFICATE OF CORRECTION

PATENT NO. : 5,442,622
DATED : August 15, 1995
INVENTOR(S) : Makoto Hokari

It is certified that error appears in the above-indentified patent and that said Letters Patent is hereby corrected as shown below:

Col. 2, line 14, delete "fie" and insert --tie--.

Col. 5, line 7, delete "sized" and insert --seized--.

Col. 6, line 23, delete "arid" and insert --and--.

Col. 8, line 21, delete "arid" and insert --and--.

Col. 11, line 6, delete "mean" and insert --means--.

Signed and Sealed this

Twenty-first Day of May, 1996

Attest:

BRUCE LEHMAN

*Attesting Officer*     *Commissioner of Patents and Trademarks*